United States Patent

[11] 3,529,525

[72] Inventor Kan Yamashita,
331-4 Yomogawa-cho, Amagasaki-shi,
Hyogo-ken, Japan
[21] Appl. No. 712,286
[22] Filed March 11, 1968
[45] Patented Sept. 22, 1970
[32] Priority Oct. 7, 1967
[33] Japan
[31] No. 42/85 860

[54] EXCHANGE LENS MOUNTING MECHANISM FOR CAMERAS
4 Claims, 6 Drawing Figs.

[52] U.S. Cl. ........................................ 95/11,
95/44, 350/257
[51] Int. Cl. ........................................ G03b 19/00
[50] Field of Search ........................................ 95/44, 42,
11; 350/257

[56] References Cited
UNITED STATES PATENTS

| | | | |
|---|---|---|---|
| 2,780,137 | 2/1957 | Bourgeois | 95/44X |
| 2,993,425 | 7/1961 | Rentschler | 95/44X |
| 3,388,647 | 6/1968 | Yajima | 95/44X |

FOREIGN PATENTS
1,254,452 11/1967 Germany ................ 95/44

*Primary Examiner*—John M. Horan
*Assistant Examiner*—Richard L. Moses
*Attorney*—Hall and Houghton ABSTRACT: For mounting interchangeable lenses easily, quickly and firmly in cameras, the threaded barrel members of the interchangeable lenses and the matingly threaded barrel mounting member of the camera body are each provided with longitudinally extending channels dividing their threaded portions into spaced threaded sections alternating with the longitudinally extending channels. The channels of each member align with, and are of slightly greater width and depth than, the threaded sections of the mating member. Mounting is effected by aligning the threaded sections of each member with the channels of the other, relatively moving the parts axially substantially to mounted position, followed by a slight relatively turning movement to interengage the threaded sections of the members and tighten down the mounting. The threaded sections of each member are preferably equally spaced and of equal arcuate extent. Dismounting is effected by reversing the mounting movements.

Patented Sept. 22, 1970

KAN YAMASHITA,

INVENTOR

BY

ATTORNEY

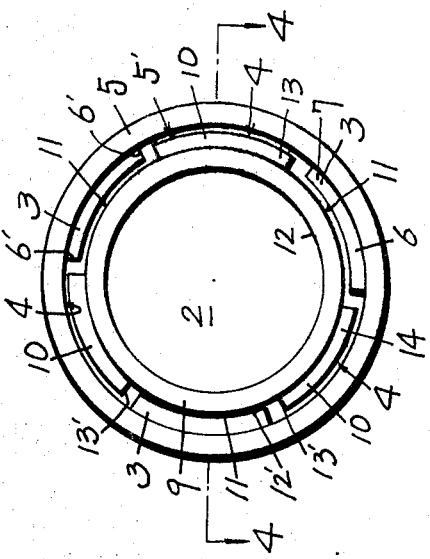
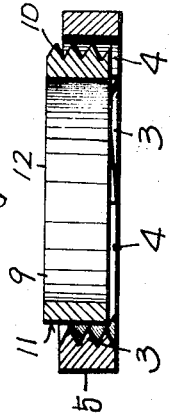
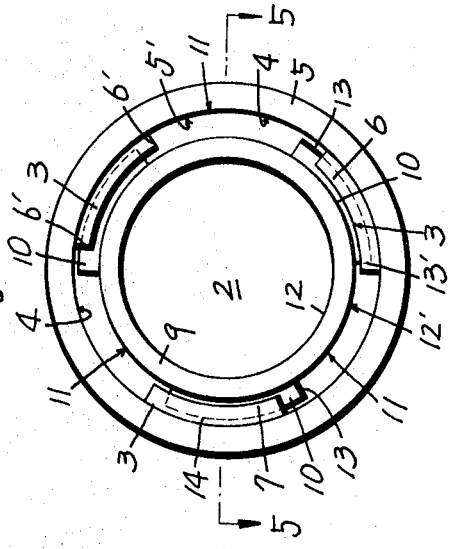
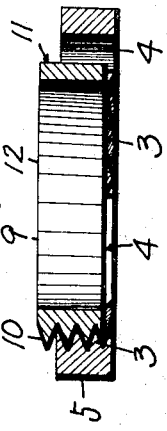

EXCHANGE LENS MOUNTING MECHANISM FOR CAMERAS

BACKGROUND OF THE INVENTION

1. Field of the Invention

The invention relates to cameras with one or more interchangeable lenses carried by threadedly attached lens barrels.

2. Description of the Prior Art

In conventional interchangeable lens cameras the lens barrel and barrel mounting members are threaded, and the barrel is rotated several turns by hand in threadedly mounting or dismounting the interchangeable lens. This practice requires considerable time and labor. Also, since it is difficult to know when the threads will disengage, there is danger of dropping and damaging the lens by not having a firm grip thereon at such time. However, the screw threaded mounting is advantageous as it affords a firm mounting of the lens barrel.

SUMMARY OF THE INVENTION

This invention has for its general object the provision of an interchangeable lens mounting means for cameras which enables easy and rapid mounting and dismounting of the interchangeable lenses as well as firm support thereof. Generally, selected or substituted ones of the interchangeable lenses are mounted on the camera immediately before taking a picture. There are instances in which this mounting or substitution must be done speedily, and as the distance between the mounted lens and the film directly influences exposures, the mounting must be in the correct position.

According to this invention such ends are achieved by providing each of the threaded lens barrel members and the matingly threaded barrel mounting member with longitudinally extending channels dividing the threaded surfaces thereof into spaced threaded sections alternating with the longitudinally extending channels. The channels of each member align with, and are of slightly greater width and depth than, the threaded sections of the mating member. Mounting thus can be speedily effected by aligning the threaded sections of a lens barrel with the channels of the barrel mounting, relatively moving the parts axially substantially to mounted position, and then relatively rotating the parts only a fraction of a turn to interengage all of the several lands and grooves of the threaded sections between the channels to tighten down the mounting and correctly position the lens in as firm a manner as is achieved by rotation through several complete turns of the screw threads in the conventionally threaded prior art arrangement. And as only a fraction of a turn, followed by axial lengthwise movement, is needed to dismount the lens, such can be achieved without relaxing the grip of the fingers on the parts, and chance of dropping of either part is thus greatly reduced.

BRIEF DESCRIPTION OF THE DRAWINGS

In the accompanying drawings illustrating an embodiment of the invention:

FIGS. 2 and 3 are detailed views showing the coactions of the channels and threaded sections of the embodiment of FIGS. 1A and 1B in the inserted and tightened state, respectively;

FIG. 4 is a sectional view taken along the line 4—4 of FIG. 2; and

FIG. 5 is a sectional view taken along the line 5—5 of FIG. 3.

Referring to FIG. 1B, the inner peripheral surface 5' of the lens mounting member 2 is provided with circumferentially equispaced female screw portions 3 alternating with longitudinally extending channels 4.

In more detail: the inner peripheral surface 5' of a ring 5 defining the opening 2 is provided with circumferentially equispaced arcuate projections 6, the number of such projections being, e.g., three. The circumferential width of each projection is slightly less than 60° and the axial width thereof has such a size as to allow the cutting of screw grooves, e.g. 3—6 screw grooves. The opposite lateral surfaces 6' of each projection are normal to the inner peripheral surface 5' and parallel to the axial direction. The opposed lateral surfaces 6' and the portion of the inner peripheral surface 5' located therebetween cooperate with each other to form the channel 4.

Figure 1A:
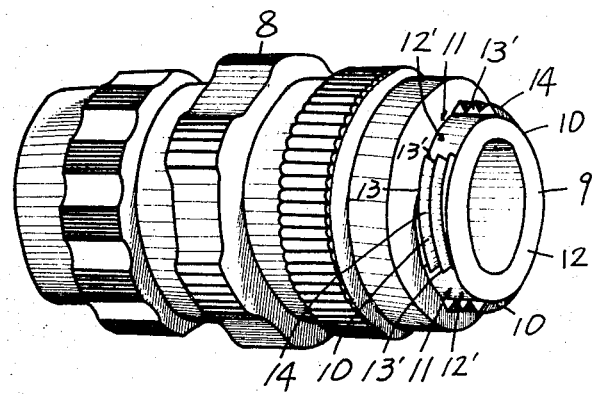
FIG. 1A and FIG. 1B are perspective views, respectively, of a threaded lens barrel member and a camera body with a threaded barrel mounting member, both modified with cooperating channels according to the invention.
Figure 1B:
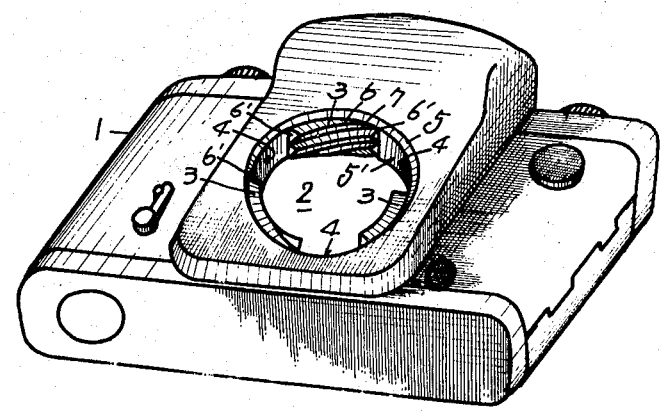

The entire inner peripheral surface of each arcuate projection 6 is provided with screw grooves, e.g. 3—6 screw grooves 7, cut therein. Although the female screw grooves 7 are interrupted by the presence of the channels 4, they are spirally cut in several lines along the arcuate surfaces constituted by the projections 6. If a thick-walled ring 5 having a size selected with an allowance for the cutting of the screw grooves 7 is prepared and subjected to cutting to form screw grooves in its entire inner peripheral surface, followed by the axial cutting of the channels in the threaded surface, the female screw portions 3 and channels 4 can be easily formed. Each of the interchangeable lenses, one of which is shown at 8, FIG. 1A, is provided with a barrel 9 projecting from the root portion thereof. The outer peripheral surface of the barrel is provided with male screw portions 10 adapted to be threadedly engaged with said female screw portions 3 and longitudinal channels 11 to provide for longitudinal movement therein of the female screw portions 3. In more detail: the outer peripheral surface 12' of a ring 12 constituting the barrel 9 is provided with circumferentially equispaced projections 13, e.g., three such projections. The circumferential width of each projection is slightly less than 60° and the axial width thereof has such a size as to allow the cutting of screw threads, e.g. 3—6 screw threads.

The opposite lateral surfaces 13' of each projection extend radially of the center of the ring 5. The opposed lateral surfaces 13' and the portion of the outer peripheral surface 12' located therebetween cooperate with each other to form a channel 11. The outer peripheral surface of each projection 13 is provided with screw threads 14, e.g. 3—6 screw threads. Although the screw threads 14 are interrupted by the presence of the channels 11, they are spirally cut in several lines along the arcuate surface constituted by each projection 13. If a thick-walled ring 12 having a size selected with an allowance for the cutting of the screw threads 14 is prepared and subjected to cutting to form screw threads on its entire outer surface, followed by the axial cutting of the surface, structure can be easily formed.

In order to attach the body 8 to the camera body, it is held with the fingers and the barrel 9 at the root portion is placed against the inlet portion of the opening 2 in the cameral body 8. Then either the lens body 8 or the cameral body 1 is suitably rotated a fraction of a turn to align the screw threaded sections 10 with the channels 4. This action also aligns the screw threaded sections 3 with the channels 11, FIG. 2. The barrel 8 is then simply pushed axially into the barrel mounting opening 2 as far as abutment of opposed parts of the barrel 8 and camera body 1 will permit. During the insertion, each threaded section of one member is guided by a channel of the other, so that the portions 10 and 3 are axially slid until the entire barrel 9 fits perfectly in the opening 2.

Thus the screw threads 14 on each male screw portion 10 are positioned laterally of the screw grooves 7 in the corresponding female screw portion 3, in an aligned state. Subsequently, in this condition a slight amount of turn, e.g. one-sixth turn, is given either to the barrel 8 or to the camera body 1 in the screw tightening direction, as shown in FIG. 3, whereupon the female screw portion 3 and male screw portions 10 are circumferentially slid along their respective channels 4 and 11 so that the several screw threads 14 are threadedly engaged with the several screw grooves 7 throughout, with the result that the barrel 8 is threadedly mounted in the opening 2 firmly and dependably.

The dismounting of the barrel 8 may be easily effected in reverse order, by simply giving a slight amount of turn to it in the screw loosening direction and pulling it out.

In the present invention, conventional camera bodies and lens bodies may be used as such, provided that they are of the screw thread mounted type. That is, if the diameter and pitch of the threading of the portions 3 and 10 of the cameral and lens barrels constructed according to the present invention are conformed to those of a conventional thread mounted interchangeable lens camera, then conventionally threaded interchangeable lens barrels can still be used with the camera portion of the present invention, and the specially threaded lens barrels of the present invention can also be used with a conventionally threaded camera (although without the savings of the time and other advantages of the present invention in its entirety), which is a convenience to purchasers and to marketers of cameras in maintaining their stocks. In the use of the invention in its entirety, the channels also can guide the threaded portions into perfect alignment ready to be engaged exactly, thus minimizing the danger of crossing of the threads and of the expense incident thereto, besides which the structure itself is simple and inexpensive.

I claim:

1. A photographic camera comprising, in combination, a camera body having a mounting member defining an opening for the mounting of a lens barrel thereto, and a lens barrel member removably seated on said mounting member; said barrel and mounting members being matingly screw threaded and said screw threading extending for several complete peripheral turns about the longitudinal axis thereof, and said barrel and mounting members having longitudinally extending channels in their threaded surfaces dividing said threaded surfaces into a plurality of arcuate threaded portions separated by said channels; said channels being slightly deeper than the threaded portions between them and being in arcuate extent slightly wider than said threaded portions, and being correspondingly placed in the threaded surfaces of said lens barrel and said mounting member, whereby mounting of said lens barrel in said mounting member may be quickly and accurately accomplished by aligning the threaded and channel portions of said lens barrel with the channels and threaded portions of said mounting member, respectively, axially relatively sliding the lens barrel and camera body toward each other substantially to the seated position thereof with said threaded portions sliding past each other in said channels, and then relatively rotating the lens barrel and body a fraction of a turn to simultaneously engage the several turns of the several threaded portions of the body with those of the barrel and draw the barrel and body into firmly seated relation.

2. A photographic camera as claimed in claim 1, wherein the channels of each member are of such depth as to guide the sliding therethrough of the arcuate threaded portions of the other member when aligned therewith, thereby axially aligning the parts as the threads of each threaded portion of one member are positioned laterally of the grooves of the threaded portions of the other member, thus to reduce any likelihood of causing cross-threading when relatively rotating the members to interengage the threaded portions thereof.

3. A photographic camera as claimed in claim 1, wherein the plurality of arcuately threaded portions of each of the lens barrel members and the mounting member are equispaced peripherally thereof, and arcuately embrace, in total, nearly 180° of the 360° periphery of each of said members, and the channels of each member arcuately embrace, in total, slightly more than 180° of the pheriphery of said member.

4. A photograhic camera and claimed in claim 3, wherein each member comprises three arcuate threaded portions each of slightly less than 60° arcuate width and three channels each of slightly more than 60° arcuate width.